May 14, 1935.   J. H. VICTOR   2,001,225

SKELETON METAL BACKED GASKET

Filed Jan. 17, 1934   3 Sheets-Sheet 1

JOHN H. VICTOR
INVENTOR

PER  Albert J. Fihe
ATTORNEY

JOHN H. VICTOR
INVENTOR

PER Albert J. Fihe
ATTORNEY

May 14, 1935.  J. H. VICTOR  2,001,225
SKELETON METAL BACKED GASKET
Filed Jan. 17, 1934  3 Sheets-Sheet 3

JOHN H. VICTOR
INVENTOR

PER

ATTORNEY

Patented May 14, 1935

2,001,225

UNITED STATES PATENT OFFICE 2,001,225

SKELETON METAL-BACKED GASKET

John H. Victor, Evanston, Ill., assignor to Victor Manufacturing & Gasket Company, Chicago, Ill., a corporation of Illinois Application January 17, 1934, Serial No. 706,932

2 Claims. (Cl. 288—1)

REISSUED

This invention relates to an improved skeleton metal-backed gasket and has for one of its principal objects the provision of a gasket that shall be particularly adapted for use with high compression engines.

One of the important objects of this invention is to provide a gasket in which the metal face of the gasket is cut away so as to provide contact between the metal faces of the joint and the packing material of the gasket, thus avoiding possibility of leaks that might occur incident to metal to metal contact of the cylinder head and block and the steel or other metal portion of the gasket.

Another important object of the invention is to provide a gasket the thickness of which is pre-determined to a very considerable degree of accuracy, so that the maximum efficiency of the motor, with which such a gasket is used, shall result. This pre-determining of the thickness and density of the gasket eliminates the necessity of later tightening of the studs after the gasket has been in use.

Another object of the invention is to provide a gasket wherein the thickness and density are so pre-determined that when in use the combustion chamber of the motor will correspond accurately to the specifications of the motor manufacturer, thereby eliminating knock owing to too high compression resulting from a thin gasket and sluggishness resulting from over capacity produced by a gasket which is too thick.

Still another object of the invention is provision of a gasket having a resilient packing which packing has been preliminarily and specially treated to make it non-sticking and also impervious to oil, gas and water and such other liquids or cooling elements which may come in contact therewith.

A still further object is the provision of integral flanges and semi-flanges around the water and stud holes of the gasket, whereby the same may be readily applied and as quickly removed without damage or distortion, and also thereby eliminating the necessity of added expense of grommets at these openings.

Another definite object is to provide, in a gasket, a combination of an impervious cushioning element and a high heat resisting metal binding or backing therefor of a skeleton type, the two being constructed and assembled so that a unitary gasket of a controlled thickness and density results.

Another object is the provision of a gasket of a skeleton type wherein a saving of metal results, this being particularly advantageous in the event that expensive metal backing is employed and also in the event of the use of plated steel whereby considerable plating expense is eliminated.

A further object is the protection by metal edging of the outer edges of a gasket and those edges which are exposed to the action of heat and exploding gases, thereby providing a soft and resilient gasket with all combustion chamber openings as well as bolt holes and water holes bound with metal integral with the back and outer edges.

A further important object includes the reinforcing by shims of the narrow portions of the gasket between cylinder openings.

Other and further important objects of the invention will be apparent from the disclosures in the accompanying drawings and following specification.

The invention, in a preferred form, is illustrated in the drawings and hereinafter more fully described.

Figure 1:
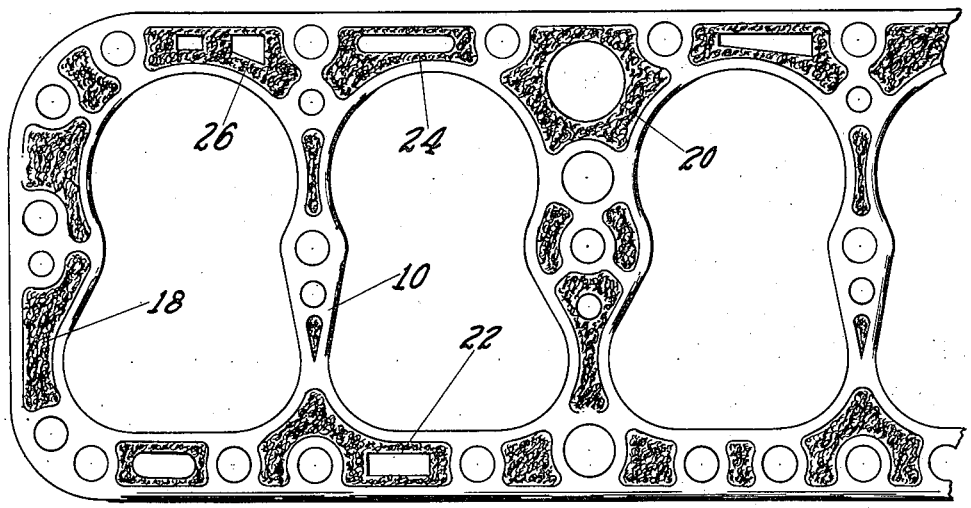
Figure 1 is a plan view of a high compression gasket constructed in accordance with the principles of this invention.

The reference numeral 10 indicates generally a metallic back for the improved skeleton metal-backed gasket of this invention, the same being, as best shown in Figures 1 to 6 inclusive, on one piece having service openings therein for outlining the cylinders, stud holes and water ports, and being defined by a complete outer periphery.

Figure 2:
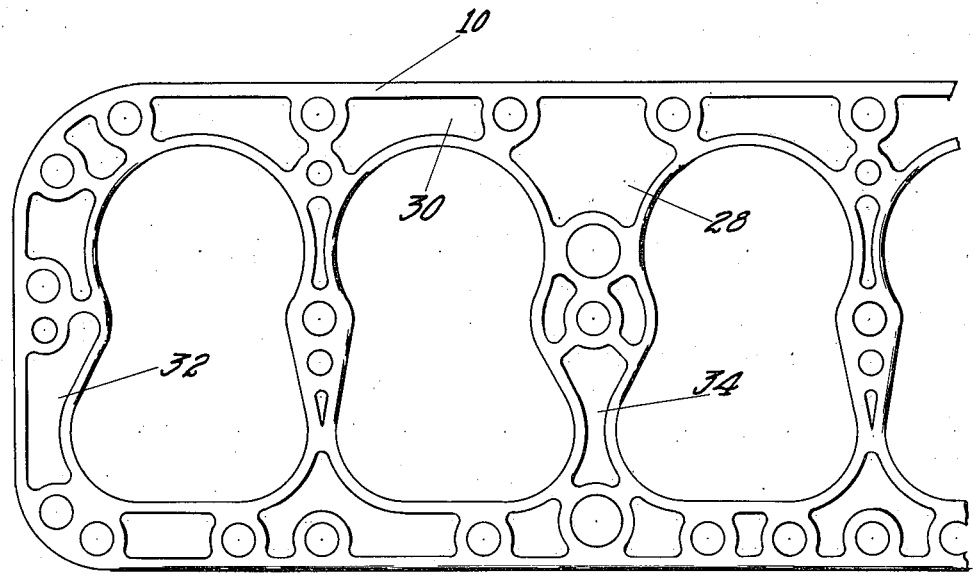
Figure 2 is a plan view of another embodiment of the gasket.
Figure 3:
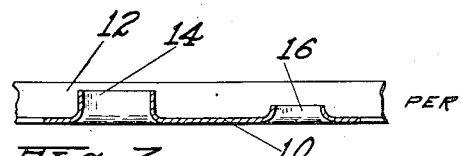
Figure 3 is a detail sectional view, showing the construction of the metal back.

Those portions of the metal back which define the various openings are all joined together in an integral unit as best shown in Figures 1, 2, 4, and 5; and as best illustrated in Figure 3, upturned integral flanges 12, 14 and 16 are provided, the flanges 12 being for the outer edges and for the combustion openings. The flanges 14 are adapted to surround the water ports, and as will be seen from Figure 3, are of a slightly less height than the flanges 12. The flanges 16 are of even less height than the flanges 14, but all of the flanges are integral with the back 10.

Figure 4:
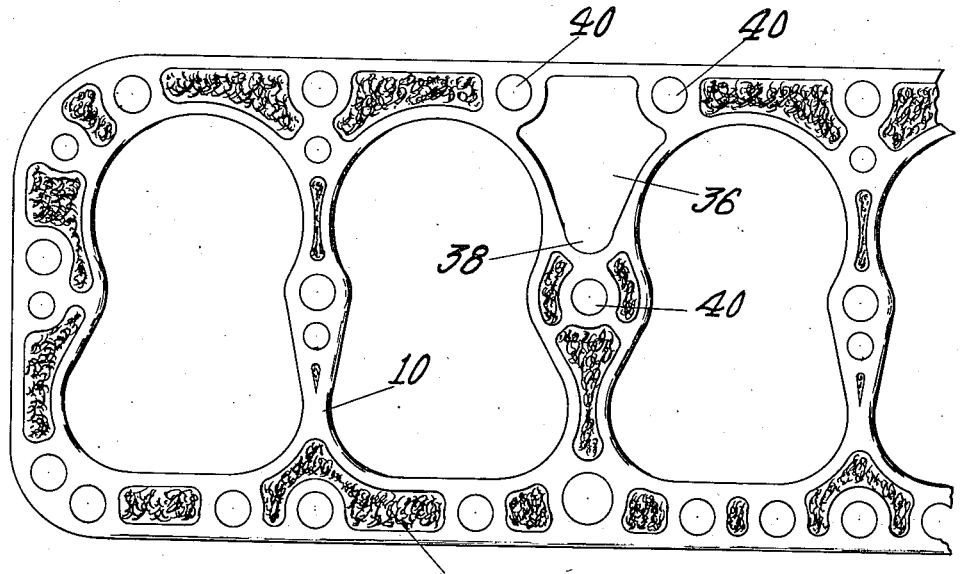
Figure 4 is a plan view, showing another modification of the invention.
Figure 5:
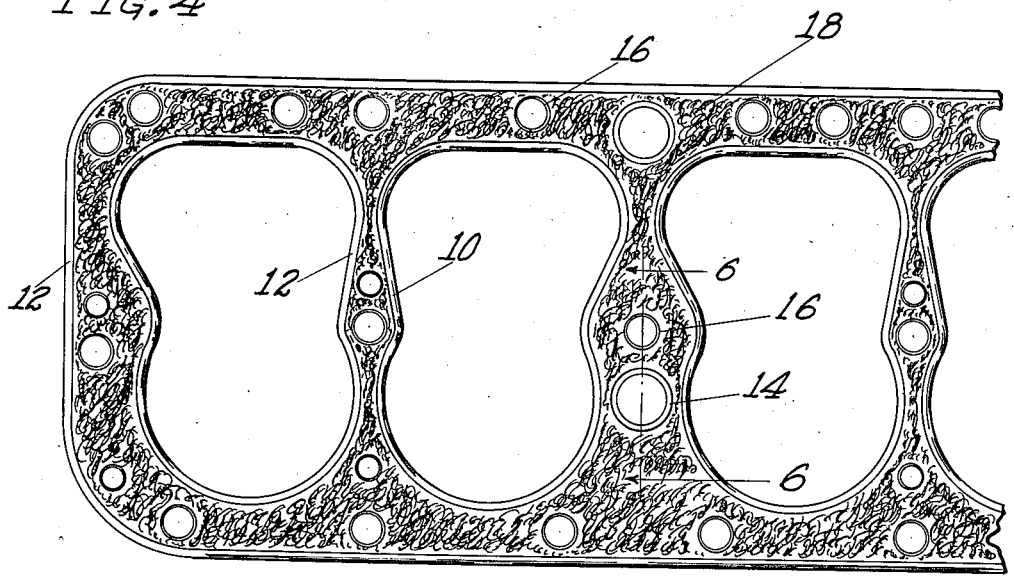
Figure 5 is a plan view of a gasket constructed in accordance with the principles of this invention, illustrating particularly the integral flanges and semi-flanges for the water and stud holes respectively.
Figure 6:
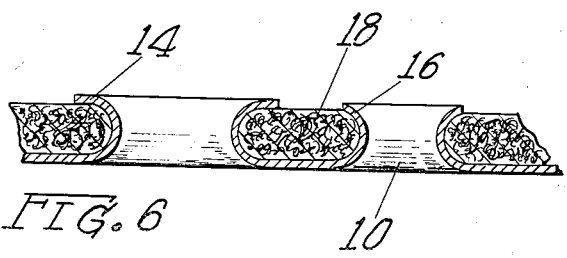
Figure 6 is an enlarged sectional view taken on the line 6—6 of Figure 5, showing in still more detail the flanged construction.

Into a backing of metal thus formed is inserted a correspondingly formed or die-cut sheet of asbestos or other packing material 18 as best shown in Figures 1, 4 and 5; and as illustrated in Figures 5 and 6, the flanges 12, 14 and 16 are then turned over and downwardly into a gripping relationship with the sheet of asbestos 18. In this way, a complete gasket is formed of two pieces, the metal backing and the cushioning material, while at the same time providing all the necessary openings and the desired contour. The flanges 12 are, as best shown in Figure 5, of greater extent on the upper surface of the gasket than the flanges 14 and 16, and thereby provide a better gripping relationship with the edges of the asbestos or other packing 18, and also provide a much more effective barrier against blow-outs and the hot gases resulting from combustion in the cylinders. The flanges 14 around the water holes are of sufficient extent to prevent seepage or wicking, while the flanges 16 around the stud holes are simply of an extent to insure suitable protection against any accidental sticking or catching of the corresponding edges of the gasket on the studs themselves when the same is being either applied or removed.

As best shown in Figure 1, certain portions of the asbestos or other packing 18 can be cut away to allow of a better compression and reduction of thickness at any desired or necessary points, and thereby providing for a more adequate regulation of the thickness and density of the gasket proper. As illustrated, these cut away portions may be of any desired or necessary size, and may be circular as shown at 20, rectangular as illustrated at 22 or of rounded or irregular shapes as shown at 24, 26, etc. One relatively large opening or a plurality of relatively small ones may be employed as desired.

The combination of cut-away portions of the metal backing and complete perforation and absolute removal of portions of the cushioning or packing material allows of a very accurate distribution of pressure on the remaining portions of the gasket and also permits of a positive control of thickness and the production of required density at all points. This is accomplished without in any way sacrificing the ordinary efficiency of the gasket including its resistance to blow-outs and the effective barrier action against burning of the edges adjacent the combustion chambers, and seepage or leaking is considerably decreased. This is due to the fact that a much more effective and close contact between the vital portions of the gasket and adjacent portions of the cylinder head and block is established.

In Figure 2 is illustrated a further development of the cutting away of the cushioning material shown in Figure 1 wherein all of the cushioning material not covered by the metal back is eliminated.

This cutting away produces openings of considerable size and of definite contour clear through the gasket, leaving only narrow ribs as illustrated at 28, 30, 32, 34, etc., and in this instance, the regulation of the working thickness and the requisite density of the active portions of the gasket is accomplished to a maximum degree. The air spaces 28, 30, 32 and 34, in addition to allowing of a better control of the contact, density and thickness of the gasket, also provide insulating chambers and stop gaps against leakage or escape of gases and seepage of liquids in the event that any such leakage or seepage does take place. The openings, primarily however, are for the production of better compression on the actual contact surfaces, thereby avoiding the possibility of leakage.

As shown at 36 in Figure 4, certain portions of the insulating material 18 may be completely cut away, and adjacent flanges connecting the resultant openings to water holes or the like 38 may be also eliminated, thereby allowing of a free passage of circulating water or other cooling medium to the space 36 provided by the elimination of the gasket material at these points. This, in addition to allowing of a better cooling effect, also provides for a further and more accurate adjustment of thickness, density and pressure on adjacent portions of the gasket, this being regulated by the tension on the bolts applied to the studs passing through the stud holes 40 adjacent the cut-away portions. Obviously, this cutting away may be done at any desired points so that additional water circulation and attendant regulation of density and thickness can be produced over any and all areas of such a gasket, and also allowing water to come into closer contact with those portions of the gasket next to the combustion chamber openings.

In all events, especially those where contact is had between the water and the asbestos or other resilient packing material, the packing material is preliminarily saturated or otherwise treated to render the same positively waterproof and resistant to the action or penetration of water or similar liquids.

Figure 7:
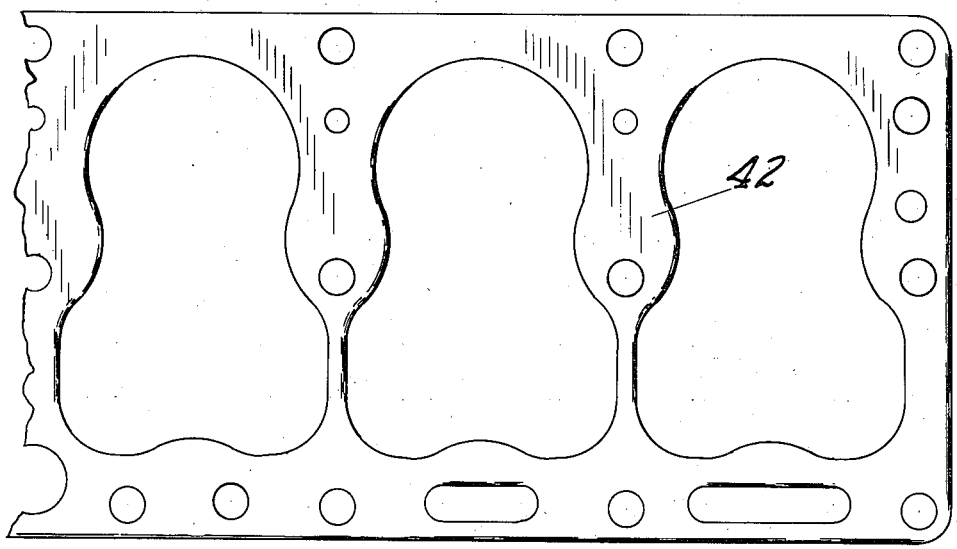
Figure 7 is a plan view illustrating a further modification of the invention wherein one face comprises a solid metal sheet preferably of a relatively soft metal.
Figure 8:
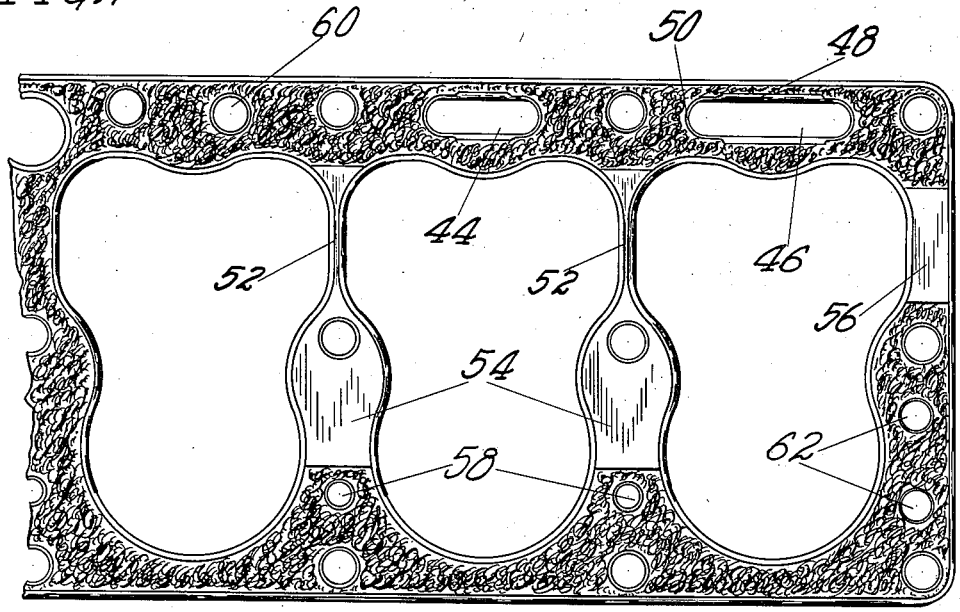
Figure 8 is a plan view of the opposite face of the gasket shown in Figure 7.

In Figure 7 is shown another modification of the invention wherein the entire back is composed of a single sheet of relatively soft metal 42 having the necessary flanged stud and water hole openings formed therein. Figure 8 is a representation of a reverse or upper face of the gasket shown in Figure 7, and it will be noted that the flanges around certain of the water openings, as those shown at 44 and 46, are of greater extent along the straight side edges 48 than they are at the rounded ends 50, thereby providing a better gripping and clinching of the cushioning material at points where such action is most desirable while at the same time adequately providing against leakage or seepage.

Those portions of the gasket where blow-outs are most likely to occur, namely the points 52 between adjacent cylinders, are reinforced by metal facings or shims 54 which are applied to the cushioning material and then clinched under the upturned flanges of the metal back 42, also making the gasket extra thick at this point. This provides additional resistance to blow-outs at the vital points and further produces extra paths for lateral heat transfer. It will be obvious that these metal shims can be incorporated at any other points where such protection is necessary or desirable, as, for example, over the area 56 or around any water holes, stud openings or the like in the event that a tendency to leakage or seepage manifests itself at any of these points with regard to a particular motor or in any special gasket construction.

The shimming can also be placed to prevent cylinder distortion. For example, this same style of shim along the upper or lower part and running the entire length of the gasket may be provided and clamped in position on a gasket for the purpose of preventing cylinder wall and valve seat distortion. The width of the shim may be as required.

The sizes of the openings for the passage of water such as those illustrated at 58, 60 and 62 in Figure 8 may be varied so as to control the extent of flow of cooling liquid from the cylinder head to the block and vice versa. This is particularly advantageous under conditions where more cooling action is required at one end of the block than at the other. A gasket with an insert here is accordingly acting as a control element and baffle for the cooling liquid. Shimming as described is particularly valuable here and also in cases where the cylinder head is provided with additional water openings which terminate at the face of the gasket.

In some instances, openings for the passage of oil are provided in the cylinder block and head and suitably reinforced corresponding openings in the gasket may be provided for this oil passage, these being similar to the openings 58, 60 and 62 previously described.

It will be evident that herein is provided a gasket which is particularly adapted for use with high compression engines as its thickness and density can be accurately controlled during the time of manufacture and process of application and which will remain so while it is in position in the motor. The elimination of inconsequential and unnecessary portions of the cushioning material provides for lighter weight and a probable increase in efficiency, while the fact that the preferred embodiment of the gasket is composed of only two pieces, namely the skeleton metal back and the corresponding skeleton framework of the cushioning material, preferably asbestos millboard, produces a combination of cost reduction and increased efficiency which is unparalleled. The additional cooling effect produced by opening one or more of the water ports into spaces cut out of the gasket material also constitutes an important feature, as, in addition to a better cooling effect, a much tighter fit and a closer relationship between the gaskets and adjacent parts is accordingly produced. Another possible increase in efficiency will result from the increased lateral heat transfer from the combustion openings to the water circulation holes and outer edges.

The reinforcing of various other portions of the gasket by shims at desired points produces a further advantage, and the fact that the gasket is protected at all exposed edges by integral flanges of satisfactory extent renders the same proof against damage in handling, shipping, application and removal, not to mention the additional advantages of control of thickness and density which are highly important in a gasket for the modern high compression internal combustion engine. The cutting away of portions of the packing material at desired points relieves the strain on studs by decreasing the surface area of the material compressed.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A gasket comprising a sheet of asbestos having service openings therethrough, a metallic back secured to one side of said sheet, certain juxtaposed portions of the metal backing and asbestos being cut away to provide openings in addition to the service openings.

2. A gasket, comprising a sheet of asbestos having service openings therethrough, a metallic back secured to one side of said sheet, certain portions of the back and asbestos being cut away to provide openings in addition to the service openings, the asbestos extending beyond the cut-away portions of the back.

JOHN H. VICTOR.